United States Patent
Fu et al.

(10) Patent No.: US 10,475,214 B2
(45) Date of Patent: Nov. 12, 2019

(54) TOMOGRAPHIC RECONSTRUCTION BASED ON DEEP LEARNING

(71) Applicant: General Electric Company, Schenectady, NY (US)

(72) Inventors: Lin Fu, Niskayuna, NY (US); Sathish Ramani, Niskayuna, NY (US); Bruno Kristiaan Bernard De Man, Clifton Park, NY (US); Xue Rui, Clifton Park, NY (US); Sangtae Ahn, Guilderland, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 63 days.

(21) Appl. No.: 15/480,172

(22) Filed: Apr. 5, 2017

(65) Prior Publication Data

US 2018/0293762 A1    Oct. 11, 2018

(51) Int. Cl.
*G06K 9/66* (2006.01)
*G06T 11/00* (2006.01)

(52) U.S. Cl.
CPC .............. *G06T 11/003* (2013.01); *G06K 9/66* (2013.01); *G06T 2210/41* (2013.01)

(58) Field of Classification Search
CPC ..... G06T 11/003; G06T 2210/41; G06K 9/66; G06N 3/00
USPC .................................................. 706/15–44
See application file for complete search history.

(56) References Cited

U.S. PATENT DOCUMENTS

| | | | | |
|---|---|---|---|---|
| 5,031,154 A | * | 7/1991 | Watanabe | G03H 3/00 367/8 |
| 5,490,164 A | * | 2/1996 | Shimura | G06K 9/4638 706/26 |
| 5,727,041 A | * | 3/1998 | Hsieh | A61B 6/032 378/4 |
| 5,729,660 A | * | 3/1998 | Chiabrera | G06N 3/0675 706/14 |
| 5,796,921 A | * | 8/1998 | Minamino | G06K 9/6232 706/25 |

(Continued)

FOREIGN PATENT DOCUMENTS

| | | |
|---|---|---|
| WO | 2016075331 A2 | 5/2016 |
| WO | WO-2017223560 A1 * 12/2017 | ............ A61B 6/032 |

OTHER PUBLICATIONS

"A Perspective on Deep Imaging", GE Wang, IEEE Access, vol. 4, 2016, p. 8914-8924, printed version Jan. 4, 2017. (Year : 2017).*

(Continued)

*Primary Examiner* — Brenda C Bernardi
(74) *Attorney, Agent, or Firm* — Fletcher Yoder, P.C.

(57) ABSTRACT

The present approach relates to the use of machine learning and deep learning systems suitable for solving large-scale, space-variant tomographic reconstruction and/or correction problems. In certain embodiments, a tomographic transform of measured data obtained from a tomography scanner is used as an input to a neural network. In accordance with certain aspects of the present approach, the tomographic transform operation(s) is performed separate from or outside the neural network such that the result of the tomographic transform operation is instead provided as an input to the neural network. In addition, in certain embodiments, one or more layers of the neural network may be provided as wavelet filter banks.

18 Claims, 8 Drawing Sheets

(56) References Cited

U.S. PATENT DOCUMENTS

| | | | | |
|---|---|---|---|---|
| 5,987,444 A * | 11/1999 | Lo | ............................ | G06N 3/08 706/14 |
| 6,317,617 B1 * | 11/2001 | Gilhuijs | ................. | A61B 5/055 128/922 |
| 6,519,577 B1 * | 2/2003 | King | ....................... | G06F 7/026 706/41 |
| 6,650,779 B2 * | 11/2003 | Vachtesvanos | ...... | G01N 21/956 348/88 |
| 6,898,583 B1 * | 5/2005 | Rising, III | ............ | G06F 17/148 382/156 |
| 7,016,886 B2 * | 3/2006 | Cabana | .................... | G06N 3/04 706/39 |
| 9,332,953 B2 * | 5/2016 | Suzuki | ................... | A61B 6/488 |
| 9,734,601 B2 * | 8/2017 | Bresler | ................. | G06T 11/006 |
| 9,875,527 B2 * | 1/2018 | Yu | ............................ | G06K 9/46 |
| 2003/0018599 A1 * | 1/2003 | Weeks | ..................... | G06N 3/02 706/15 |
| 2005/0283450 A1 * | 12/2005 | Matsugu | ............ | G06K 9/00604 706/20 |
| 2006/0067461 A1 * | 3/2006 | Yin | ....................... | G06T 11/005 378/5 |
| 2006/0072801 A1 * | 4/2006 | Bernard Deman | ... | G06T 11/006 382/131 |
| 2006/0210131 A1 * | 9/2006 | Wheeler, Jr. | .......... | G06T 11/008 382/128 |
| 2007/0208678 A1 * | 9/2007 | Matsugu | ............... | G06K 9/4628 706/18 |
| 2011/0222750 A1 | 9/2011 | Liao et al. | | |
| 2013/0211238 A1 * | 8/2013 | DeCharms | ........... | A61B 5/4824 600/418 |
| 2014/0119628 A1 | 5/2014 | Elad et al. | | |
| 2014/0126794 A1 * | 5/2014 | Ahn | ....................... | G06T 11/008 382/131 |
| 2014/0363067 A1 | 12/2014 | Stayman et al. | | |
| 2015/0012472 A1 * | 1/2015 | Liang | ..................... | G06N 5/043 706/20 |
| 2015/0254555 A1 * | 9/2015 | Williams, Jr. | ........ | G06N 3/0454 706/14 |
| 2016/0106321 A1 | 4/2016 | Sharma et al. | | |
| 2016/0166209 A1 | 6/2016 | Itu et al. | | |
| 2016/0210762 A1 * | 7/2016 | Fu | .......................... | G06T 11/006 |
| 2017/0046616 A1 * | 2/2017 | Socher | ................... | G06N 3/088 |
| 2017/0256038 A1 * | 9/2017 | Lee | .......................... | G06T 5/005 |
| 2017/0281110 A1 * | 10/2017 | Mandelkern | ........... | A61B 6/025 |
| 2017/0362585 A1 * | 12/2017 | Wang | ...................... | G01N 33/50 |
| 2017/0372475 A1 * | 12/2017 | Gulsun | .................. | G06T 7/0012 |
| 2018/0018757 A1 * | 1/2018 | Suzuki | ................... | G06T 3/4046 |
| 2018/0047159 A1 * | 2/2018 | Schlegl | ................. | G06K 9/6267 |
| 2018/0078146 A1 * | 3/2018 | Shadforth | ............ | A61B 5/0033 |
| 2018/0078231 A1 * | 3/2018 | Butani | .................. | G06T 7/0014 |
| 2018/0099152 A1 * | 4/2018 | Nioutsikou | .......... | A61N 5/1039 |
| 2018/0132725 A1 * | 5/2018 | Vogl | ..................... | A61B 5/7267 |
| 2018/0146935 A1 * | 5/2018 | Song | ........................ | G06N 7/00 |

OTHER PUBLICATIONS

Zhao, et al. "Few-View CT reconstruction method based on deep learning", 2016 IEEE Nuclear Science Symposium, Medical Imaging Conference and Room-Temperature Semiconductor Detector Workshop, Nov. 6, 2016. (Year: 2016).*

Shijun, He, et al.; "A 3D Image Reconstruction Algorithm of Electrical Capacitance Tomography Based on Support Vector Machines", 2nd International Congress on Image and Signal Processing, Oct. 17-19, 2009.

Soltani, Sara, et al.; "Tomographic Image Reconstruction Using Training Images with Matrix and Tensor Formulations", DTU Orbit—The Research Information System, 2015.

Suzuki, Kenji; "Statistical Modeling and Machine Learning in Medical Imaging", Field of Statistical Modeling and Machine Learning in Medical Imaging, http://embc2013.embs.org/pdf/tut6.pdf.

* cited by examiner

TOMOGRAPHIC RECONSTRUCTION BASED ON DEEP LEARNING

BACKGROUND

The subject matter disclosed herein relates to tomographic reconstruction, and in particular to the use of deep learning techniques to reconstruct data, such as projection or other scan-type data, into diagnostically or clinically useful images, including cross-sectional images and/or volumetric representations.

Non-invasive imaging technologies allow images of the internal structures or features of a patient/object to be obtained without performing an invasive procedure on the patient/object. In particular, such non-invasive imaging technologies rely on various physical principles (such as the differential transmission of X-rays through the target volume, the reflection of acoustic waves within the volume, the paramagnetic properties of different tissues and materials within the volume, the breakdown of targeted radionuclides within the body, and so forth) to acquire data and to construct images or otherwise represent the observed internal features of the patient/object.

All reconstruction algorithms are subject to various trade-offs, such as between computational efficiency, patient dose, scanning speed, image quality, and artifacts. By way of example, machining learning architectures based on convolutional neural networks (CNN) have set benchmarks in a number of pattern recognition, image processing, detection and classification tasks. However, in a tomographic reconstruction context, a CNN may be unsuitable as conventionally implemented. In particular, a CNN is typically constructed based on the principles of local connectivity and weights sharing. Weight sharing (i.e., space-invariant convolution) dramatically reduces the number of free parameters of the network, thus lowering the training time and memory requirements for the network. However, although successful in many computer vision problems, the principle of weights sharing also inherently limits the network to be space-invariant, i.e., features to be detected regardless of their position in the visual field, thus constituting the property of translation invariance. In other words, the convolution operation in CNN is typically implemented by Fourier filters, which is inherently translation invariant. Although this achieves good results on many computer vision problems, it becomes unsuitable for many space-variant tasks such image restoration and/or reconstruction with a space-variant point spread function (PSF). On the other hand, a fully connected deep neural network is not computationally feasible for most high dimensional problems (e.g., image reconstruction).

BRIEF DESCRIPTION

In one embodiment, a method is provided. In accordance with this method, measured data is obtained from a tomography scanner. One or more tomographic transforms of the measured data are calculated. The one or more tomographic transforms comprise at least one of a backprojection, a weighted backprojection, a reprojection, a plurality of diagonal elements of a Fisher information matrix, a variance image, a noise correlation image, a polynomial of the Fisher information matrix, or a combination thereof. The one or more tomographic transforms are provided as one or more inputs to a trained neural network. One or more outputs are obtained from the trained neural network based on the one or more inputs.

In a further embodiment, a method is provided. In accordance with this method, measured data is obtained from a tomography scanner. One or more inputs are provided to a trained neural network comprising one or more of the measured data or one or more tomographic transforms of the measured data. The neural network comprises at least one layer based on wavelets, wavelet frames, curvelets, or other sparsifying transforms. One or more outputs are obtained from the trained neural network based on the one or more inputs.

In another embodiment, an image processing system is provided. In accordance with this embodiment, the image processing system includes: a processing component configured to execute one or more stored processor-executable routines; and a memory storing the one or more executable-routines. The one or more executable routines, when executed by the processing component, cause acts to be performed comprising: acquiring or accessing a set of scan data, wherein the set of scan data is initially represented by a set of original measurements; calculating one or more tomographic transforms of the set of scan data; providing the one or more tomographic transforms as one or more inputs to a trained neural network, wherein the trained neural network comprises at least one layer based on a wavelet filter bank; and obtaining one or more outputs from the trained neural network based on the one or more inputs.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
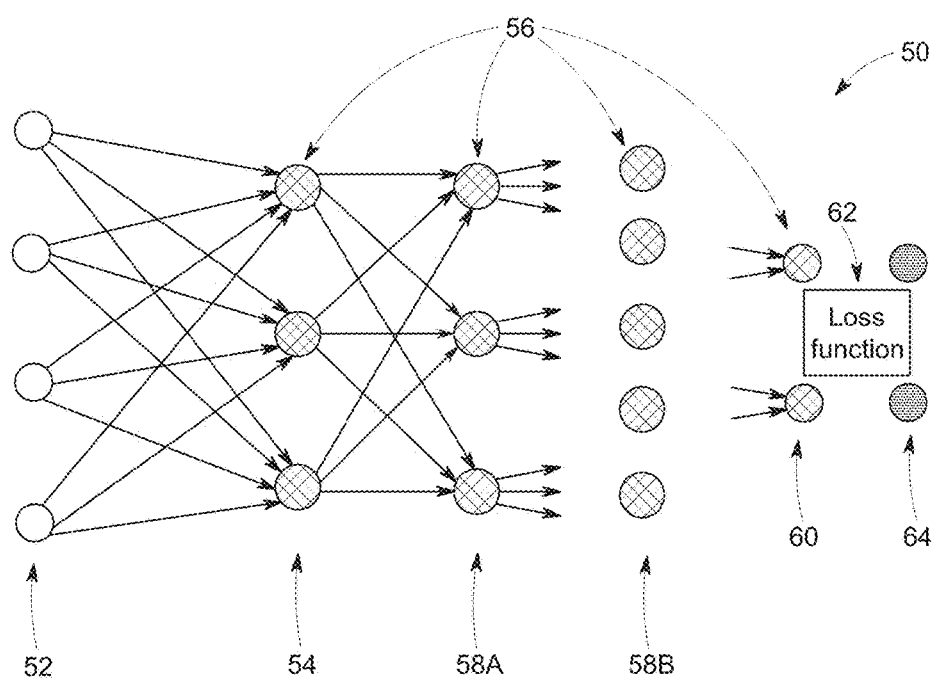
FIG. 1 depicts an example of an artificial neural network for training a deep learning model, in accordance with aspects of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure While aspects of the following discussion are provided in the context of medical imaging, it should be appreciated that the present techniques are not limited to such medical contexts. Indeed, the provision of examples and explanations in such a medical context is only to facilitate explanation by providing instances of real-world implementations and applications. However, the present approaches may also be utilized in other contexts, such as tomographic image reconstruction for industrial Computed Tomography (CT) used in non-destructive inspection of manufactured parts or goods (i.e., quality control or quality review applications), and/or the non-invasive inspection of packages, boxes, luggage, and so forth (i.e., security or screening applications). In general, the present approaches may be useful in any imaging or screening context or image processing field where a set or type of acquired data undergoes a reconstruction process to generate an image or volume.

Furthermore, while the following discussion focuses on standard images or image volumes, it should be understood that the same approach can also be applied to sets of images or image volumes corresponding to different aspects of the scan. For example, spectral CT produces a set of images, including monochromatic images at different energies as well as basis material decomposition images. Or as another example, dynamic CT or PET produces a set of images at different time points. The current invention may be applied to these sets or types of images, where the input to the hierarchy of reconstruction steps or neural networks are multiple sets of images or scan data sets and the prediction is also a set of images.

Further, though CT and C-arm examples are primarily provided herein, it should be understood that the present approach may be used in other imaging modality contexts where tomographic reconstruction processes are employed. For instance, the presently described approach may also be employed on data acquired by other types of tomographic scanners including, but not limited to, positron emission tomography (PET) scanners, single photon emission computed tomography (SPECT) scanners, and/or magnetic resonance imaging (MRI) scanners.

By way of example, several imaging modalities, such as X-ray CT (e.g., multi-slice CT) and X-ray C-arm systems (e.g., cone-beam CT), measure projections of the object or patient being scanned where the projections, depending on the technique, correspond to Radon transform data, fan-beam transform data, cone-beam transform data, or non-uniform Fourier transforms. In other contexts, the scan data may be emission type data (e.g., PET or SPECT data) or magnetic resonance data (e.g., MRI data) generated in response to magnetic fields and RF pulses. Tomographic reconstruction algorithms and related correction and calibration algorithms (e.g., partial volume correction, noise suppression, beam hardening artifact correction, x-ray source/detector spectral calibration, low-signal correction, scatter correction, motion correction, truncation correction, MR white pixel correction, MR field inhomogeneity artifact correction, and so forth) are employed in conjunction with these imaging modalities to generate useful cross-sectional images or volumetric images from raw measurements.

Conventional reconstruction techniques typically use reconstruction algorithms that can either be characterized as direct reconstruction (which execute an explicit inversion step) or as optimization-based reconstruction (which iteratively optimize a cost function). Direct reconstruction approaches are relatively fast but lack an efficient way to suppress noise and certain artifacts. Optimization-based reconstruction approaches offer improved noise reduction and can incorporate physics effects in the forward model that are not easily inverted analytically, but such approaches are relatively computationally expensive.

Although a large variety of reconstruction and correction algorithms are currently available for use in tomographic imaging, they can all be viewed as functional transformations from raw and/or corrupted data into meaningful and/or corrected data or images. Typically, these functional transforms are very large-scale, space-variant, and involve two-dimensional or volumetric images that contain millions to billions, or even more, variables. The scale of the tomographic image reconstruction problem makes it challenging to develop a machine learning or deep learning approach to tomographic reconstruction and/or correction. In other words, a network would be needed with many input nodes for each output node and therefore the scale of the machine learning problem becomes computationally formidable.

With this in mind, the present approach circumvents these challenges so that deep learning networks can be efficiently built for tomographic reconstruction and/or correction problems without incurring prohibitive computational cost. In particular, as discussed herein, machine learning and deep learning systems are provided that are suitable for solving large-scale, space-variant tomographic reconstruction and/or correction problems. The present approach addresses and overcomes limitations of existing convolutional neural networks (CNN) or other brute-force approaches for applying learning-based techniques to tomographic reconstruction/correction and may provide a mechanism to solve tomographic reconstruction or image correction and/or restoration problems and outperform conventional analytical or iterative algorithms in terms of: compute time, noise and artifacts reduction, accuracy, resolution, and so forth. With this in mind, the present approach may be applied in a variety of tomography context, including, but not limited to image reconstruction, image denoising, partial volume correction, determination or correction of a standard uptake value (SUV), quantitation correction, noise variance estimation, and so on.

With the preceding introductory comments in mind, some embodiments of the approaches described herein utilize neural networks as part of the reconstruction process used to generate tomographic images, such as CT, PET, SPECT, C-arm, phase-contrast, and MR images. Neural networks as discussed herein may encompass deep neural networks, fully connected networks, convolutional neural networks (CNNs), perceptrons, auto encoders, recurrent networks, wavelet filter banks, or other neural network architectures. These techniques are referred to herein as deep learning techniques, though this terminology may also be used specifically in reference to the use of deep neural networks, which is a neural network having a plurality of layers.

As discussed herein, deep learning techniques (which may also be known as deep machine learning, hierarchical learning, or deep structured learning) are a branch of machine learning techniques that employ mathematical representations of data and artificial neural network for learning. By way of example, deep learning approaches may be characterized by their use of one or more algorithms to extract or model high level abstractions of a type of data of interest. This may be accomplished using one or more processing layers, with each layer typically corresponding to a different level of abstraction and, therefore potentially employing or utilizing different aspects of the initial data or outputs of a preceding layer (i.e., a hierarchy or cascade of layers) as the target of the processes or algorithms of a given layer. In an image processing or reconstruction context, this may be characterized as different layers corresponding to the different feature levels or resolution in the data.

In general, the processing from one representation space to the next-level representation space can be considered as one 'stage' of the reconstruction process. Each stage of the reconstruction can be performed by separate neural networks or by different parts of one larger neural network. For example, as discussed herein, a single deep learning network may cover all stages in a reconstruction process (e.g., from an initial input (such as a sinogram) to an output image (such as a reconstructed image)). Alternatively, separate distinct deep learning network(s) may each cover only one stage (or a subset of stages) of the overall reconstruction process. For example, in the present context, such a single stage may be from an initial input (e.g., sinogram or a transform of the sinogram) to an intermediate representation, from one intermediate image or representation to another, or from an intermediate image or representation to an output, such as a diagnostic image, noise variance image, denoised image and noise pattern, partial volume effect (PVE) or PVE correction factor, standardized uptake value (SUV) or SUV correction factor, and so forth.

As discussed herein, as part of the initial training of deep learning processes to solve a particular problem, training data sets may be employed that have known initial values (e.g., input images, projection data, emission data, magnetic resonance data, and so forth) and known or desired values for a final output (e.g., reconstructed tomographic reconstructions, such as cross-sectional images or volumetric representations) of the deep learning process. The training of a single stage may have known input values corresponding to one representation space and known output values corresponding to a next-level representation space. In this manner, the deep learning algorithms may process (either in a supervised or guided manner or in an unsupervised or unguided manner) the known or training data sets until the mathematical relationships between the initial data and desired output(s) are discerned and/or the mathematical relationships between the inputs and outputs of each layer are discerned and characterized. Similarly, separate validation data sets may be employed in which both the initial and desired target values are known, but only the initial values are supplied to the trained deep learning algorithms, with the outputs then being compared to the outputs of the deep learning algorithm to validate the prior training and/or to prevent over-training.

By way of example, in one contemplated implementation, supervised training of the neural network utilizes pairs of ground truth images, the corresponding sinograms, and/or transforms of the corresponding sinograms as discussed herein. In the event there is an insufficient number of high dose clinical datasets for training, computer simulations of sinograms from clinical images with translation, rotation, scaling, and mirroring can be used. It is also possible to use computer generated random patterns (e.g., Gaussian blobs, random noise patterns, random shapes, etc.) to generate the training pairs.

With the preceding in mind, FIG. 1 schematically depicts an example of an artificial neural network 50 that may be trained as a deep learning model as discussed herein. In this example, the network 50 is multi-layered, with a training input 52 and multiple layers including an input layer 54, hidden layers 58A, 58B, and so forth, and an output layer 60 and the training target 64 present in the network 50. Each layer, in this example, is composed of a plurality of "neurons" or nodes 56. The number of neurons 56 may be constant between layers or, as depicted, may vary from layer to layer. Neurons 56 at each layer generate respective outputs that serve as inputs to the neurons 56 of the next hierarchical layer. In practice, a weighted sum of the inputs with an added bias is computed to "excite" or "activate" each respective neuron of the layers according to an activation function, such as rectified linear unit (ReLU), sigmoid function, hyperbolic tangent function, or otherwise specified or programmed. The outputs of the final layer constitute the network output 60 (e.g., predicted image) which, in conjunction with a target image 64, are used to compute some loss or error function 62, which will be backpropagated to guide the network training.

The loss or error function 62 measures the difference between the network output (i.e., a diagnostic image, noise variance image, denoised image and noise pattern, partial volume effect (PVE) or PVE correction factor, standardized uptake value (SUV) or SUV correction factor) and the training target. In certain implementations, the loss function may be the mean squared error (MSE) of the voxel-level values or partial-line-integral values and/or may account for differences involving other image features, such as image gradients or other image statistics. Alternatively, the loss function 62 could be defined by other metrics associated with the particular task in question, such as a softmax function.

With the preceding in mind, the neural network 50 may be trained for use in large-scale, space variant tomographic reconstruction as discussed herein. In a training example, the neural network 50 may first be constrained to be linear (i.e., by removing all non-linear units) to ensure a good initialization of the network parameters. The neural network 50 may also be pre-trained stage-by-stage using computer simulated input-target data sets, as discussed in greater detail below. After pre-training, the neural network 50 may be trained as a whole and further incorporate non-linear units.

To facilitate explanation of the present tomographic reconstruction approach using deep learning techniques, the present disclosure primarily discusses these approaches in the context of a CT or C-arm system. However, it should be understood that the following discussion may also be applicable to other image modalities and systems including, but not limited to, PET, SPECT, multi-spectral CT, phase-contrast imaging, and MRI, as well as to non-medical contexts or any context where tomographic reconstruction is employed to reconstruct an image.

Figure 2:
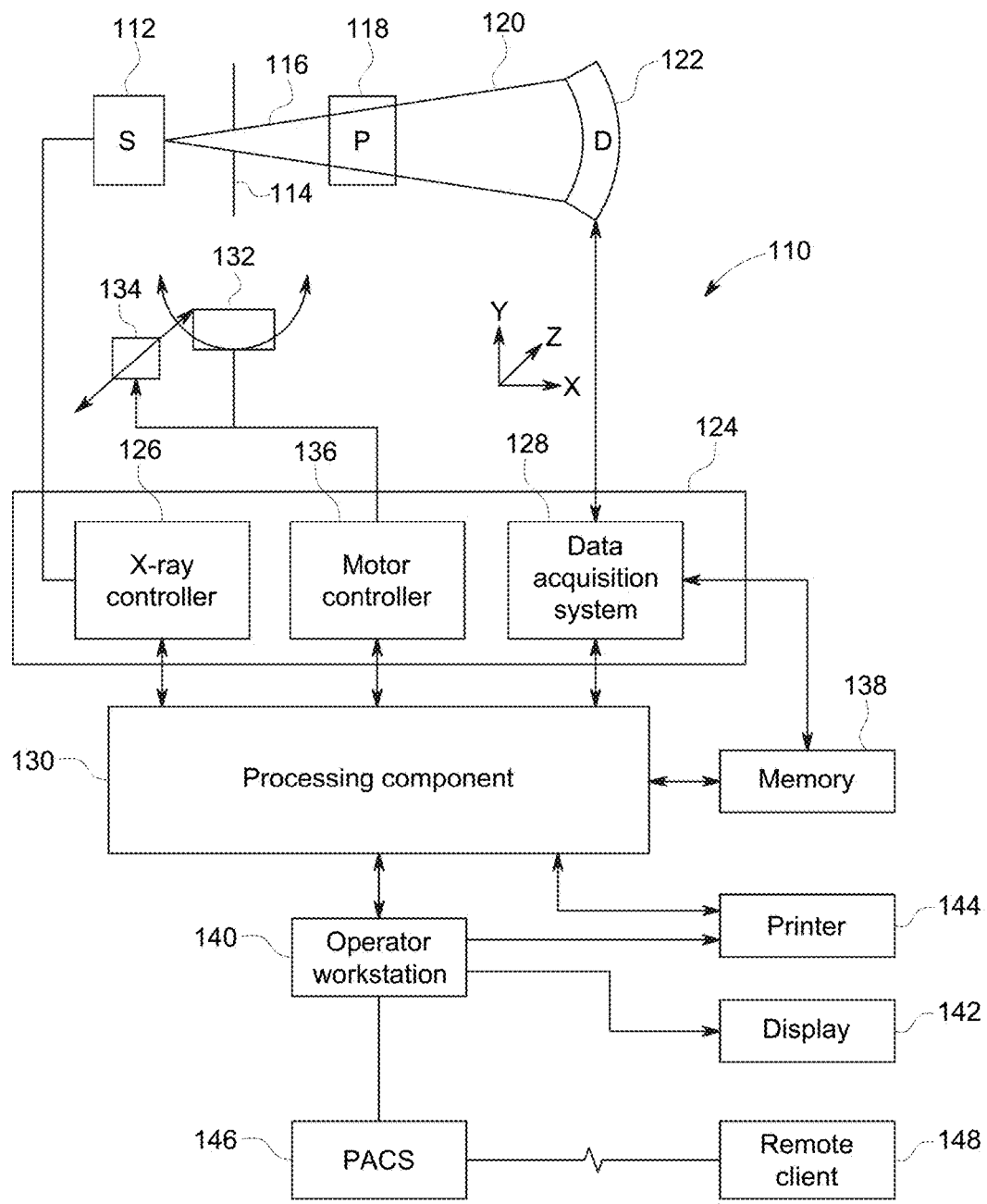
FIG. 2 is a block diagram depicting components of a computed tomography (CT) imaging system, in accordance with aspects of the present disclosure.

With this in mind, an example of an imaging system 110 (i.e., a scanner) is depicted in FIG. 2. In the depicted example, the imaging system 110 is a CT imaging system designed to acquire scan data (e.g., X-ray attenuation data) at a variety of views around a patient (or other subject or object of interest) and suitable for performing image reconstruction using tomographic reconstruction techniques. In the embodiment illustrated in FIG. 2, imaging system 110 includes a source of X-ray radiation 112 positioned adjacent to a collimator 114. The X-ray source 112 may be an X-ray tube, a distributed X-ray source (such as a solid-state or thermionic X-ray source) or any other source of X-ray radiation suitable for the acquisition of medical or other images. Conversely, in a PET or SPECT embodiments, a toroidal radiation detector may be provided and a radioactive tracer is used as a radiation source. In the case of MRI, the measurements are samples in Fourier space and can either be applied directly as the input to the neural network or can first be converted to line integrals in sinogram space.

In the depicted example, the collimator 114 shapes or limits a beam of X-rays 116 that passes into a region in which a patient/object 118, is positioned. In the depicted example, the X-rays 116 are collimated to be a cone-shaped beam, i.e., a cone-beam, that passes through the imaged volume. A portion of the X-ray radiation 120 passes through or around the patient/object 118 (or other subject of interest) and impacts a detector array, represented generally at reference numeral 122. Detector elements of the array produce electrical signals that represent the intensity of the incident X-rays 120. These signals are acquired and processed to reconstruct images of the features within the patient/object 118.

Source 112 is controlled by a system controller 124, which furnishes both power, and control signals for CT examination sequences, including acquisition of two-dimensional localizer or scout images used to identify anatomy of interest within the patient/object for subsequent scan protocols. In the depicted embodiment, the system controller 124 controls the source 112 via an X-ray controller 126 which may be a component of the system controller 124. In such an embodiment, the X-ray controller 126 may be configured to provide power and timing signals to the X-ray source 112.

Moreover, the detector 122 is coupled to the system controller 124, which controls acquisition of the signals generated in the detector 122. In the depicted embodiment, the system controller 124 acquires the signals generated by the detector using a data acquisition system 128. The data acquisition system 128 receives data collected by readout electronics of the detector 122. The data acquisition system 128 may receive sampled analog signals from the detector 122 and convert the data to digital signals for subsequent processing by a processor 130 discussed below. Alternatively, in other embodiments the digital-to-analog conversion may be performed by circuitry provided on the detector 122 itself. The system controller 124 may also execute various signal processing and filtration functions with regard to the acquired image signals, such as for initial adjustment of dynamic ranges, interleaving of digital image data, and so forth.

In the embodiment illustrated in FIG. 2, system controller 124 is coupled to a rotational subsystem 132 and a linear positioning subsystem 134. The rotational subsystem 132 enables the X-ray source 112, collimator 114 and the detector 122 to be rotated one or multiple turns around the patient/object 118, such as rotated primarily in an x,y-plane about the patient. It should be noted that the rotational subsystem 132 might include a gantry or C-arm upon which the respective X-ray emission and detection components are disposed. Thus, in such an embodiment, the system controller 124 may be utilized to operate the gantry or C-arm.

The linear positioning subsystem 134 may enable the patient/object 118, or more specifically a table supporting the patient, to be displaced within the bore of the CT system 110, such as in the z-direction relative to rotation of the gantry. Thus, the table may be linearly moved (in a continuous or step-wise fashion) within the gantry to generate images of particular areas of the patient 118. In the depicted embodiment, the system controller 124 controls the movement of the rotational subsystem 132 and/or the linear positioning subsystem 134 via a motor controller 136.

In general, system controller 124 commands operation of the imaging system 110 (such as via the operation of the source 112, detector 122, and positioning systems described above) to execute examination protocols and to process acquired data. For example, the system controller 124, via the systems and controllers noted above, may rotate a gantry supporting the source 112 and detector 122 about a subject of interest so that X-ray attenuation data may be obtained at one or more views relative to the subject. In the present context, system controller 124 may also include signal processing circuitry, associated memory circuitry for storing programs and routines executed by the computer (such as routines for performing tomographic reconstruction techniques described herein), as well as configuration parameters, image data, and so forth.

In the depicted embodiment, the image signals acquired and processed by the system controller 124 are provided to a processing component 130 for reconstruction of images in accordance with the presently disclosed algorithms. The processing component 130 may be one or more general or application-specific microprocessors. The data collected by the data acquisition system 128 may be transmitted to the processing component 130 directly or after storage in a memory 138. Any type of memory suitable for storing data might be utilized by such an exemplary system 110. For example, the memory 138 may include one or more optical, magnetic, and/or solid state memory storage structures. Moreover, the memory 138 may be located at the acquisition system site and/or may include remote storage devices for storing data, processing parameters, and/or routines for tomographic image reconstruction, as described below.

The processing component 130 may be configured to receive commands and scanning parameters from an operator via an operator workstation 140, typically equipped with a keyboard and/or other input devices. An operator may control the system 110 via the operator workstation 140. Thus, the operator may observe the reconstructed images and/or otherwise operate the system 110 using the operator workstation 140. For example, a display 142 coupled to the operator workstation 140 may be utilized to observe the reconstructed images and to control imaging. Additionally, the images may also be printed by a printer 144 which may be coupled to the operator workstation 140.

Further, the processing component 130 and operator workstation 140 may be coupled to other output devices, which may include standard or special purpose computer monitors and associated processing circuitry. One or more operator workstations 140 may be further linked in the system for outputting system parameters, requesting examinations, viewing images, and so forth. In general, displays, printers, workstations, and similar devices supplied within the system may be local to the data acquisition components, or may be remote from these components, such as elsewhere within an institution or hospital, or in an entirely different location, linked to the image acquisition system via one or more configurable networks, such as the Internet, virtual private networks, and so forth.

It should be further noted that the operator workstation 140 may also be coupled to a picture archiving and communications system (PACS) 146. PACS 146 may in turn be coupled to a remote client 148, radiology department information system (RIS), hospital information system (HIS) or to an internal or external network, so that others at different locations may gain access to the raw or processed image data.

While the preceding discussion has treated the various exemplary components of the imaging system 110 separately, these various components may be provided within a common platform or in interconnected platforms. For example, the processing component 130, memory 138, and operator workstation 140 may be provided collectively as a general or special purpose computer or workstation configured to operate in accordance with the aspects of the present disclosure. In such embodiments, the general or special purpose computer may be provided as a separate component with respect to the data acquisition components of the system 110 or may be provided in a common platform with such components. Likewise, the system controller 124 may be provided as part of such a computer or workstation or as part of a separate system dedicated to image acquisition.

The system of FIG. 2 may be utilized to acquire X-ray projection data (or other scan data for other modalities) for a variety of views about a region of interest of a patient to reconstruct images of the imaged region using the scan data. Projection (or other) data acquired by a system such as the imaging system 110 may be reconstructed as discussed herein to perform a tomographic reconstruction. In particular, the present approach utilizes deep learning techniques for tomographic reconstruction of images from large scale datasets.

In the described tomographic reconstruction approach, a tomographic transform of measured data obtained from a tomography scanner (such as an X-ray CT, PET, SPECT, MR, or C-arm system) is used as an input to a neural network 50 as described herein. In certain modality contexts, the measured data may be referred to as sinogram data or projection data. In certain implementations, tomographic transforms of measured data obtained from more than one imaging modality, or from an imaging modality different from a modality for which an image is to be reconstructed, may be provided as an input to the neural network 50. For example, a tomographic transform of PET or MR measured data may be provided as an input to a neural network 50 trained to facilitate reconstruction of a CT image instead of, or in addition to, tomographic transforms of measured CT data.

In accordance with certain aspects of the present approach, the tomographic transform operation(s) is performed separate from or outside the neural network 50 such that the result of the tomographic transform operation is instead provided as an input to the neural network 50. In this manner, the neural network 50 does not have to learn (or otherwise be trained to perform) the tomographic transform operation directly. Thus, as discussed herein, using a tomographic transform of the measured data as an input 52 to the neural network 50 reduces the complexity and dimensionality of a given reconstruction problem and may help map the data to an intermediate data space that is more advantageous for further processing by the neural network 50. This reduction in the complexity and/or dimensionality is desirable in a deep learning context. In addition, useful information in the measured (i.e., projection) data may be retained in the tomographic transform of the data whereas this information may be lost during a process of reconstructing an image from the measured data. In other words, using the tomographic transform of the measured data as an input 52 to the neural network 50 in addition to a reconstructed image may outperform using only the reconstructed image.

By way of example, the tomographic transform may be (or may be based on) one or more of a backprojection, a weighted backprojection, a preliminary or non-diagnostic image reconstruction(s), a reprojection, a plurality of diagonal elements of a Fisher information matrix, a polynomial of the Fisher information, a variance map, a noise correlation map, and so forth, as well as combinations of such operations. As used herein, backprojections and weighted backprojections are considered transforms, and not reconstructed images. In one implementation, the weighted backprojection includes an ordinary unweighted backprojection with the weights all being set to ones. As will be appreciated, certain of these transforms map the projection data space (e.g., the projection or sinogram space) into the image space. Such implementations may be based on the concept that the image space is typically more convenient to deal with for deep learning than the projection data space.

With respect to the neural network 50, as noted herein any suitable neural network architecture may be employed. By way of example, in certain implementations, a neural network architecture based on wavelet filter banks may be employed. For example, in such an implementation, one or more of the layers of the neural network 50 may be implemented as a wavelet filter bank, with different filter channels of the filter bank operating at different resolutions or spatial frequencies. With respect to such wavelet filter bank-based implementations, these approaches are suitable for handling space-variant processing, which is typically not well handled by conventional convolutional neural networks (CNN) that instead are well suited for space-invariant detection tasks.

By way of example, in a conventional CNN a convolution layer of a feedforward neural network can be expressed by:

$$y_j = f_j(\Sigma_{i=1}^m h_{j-i} x_i) \quad (1)$$

where $x_i$ is the inputs to the respective convolution layer, and $y_j$ is the output from the respective convolution layer, $h_k$ is the interconnection weight in the form of a convolution kernel, and $f_j$ is a linear or non-linear activation function (for example, a sigmoid function or a rectified linear unit, ReLU). In Fourier space, this can be written as:

$$y_j = f_j[(F^T HFX)_j] \quad (2)$$

where F represents discrete Fourier transform:

$$H \triangleq \text{diag}\{Fh\}. \quad (3)$$

In the wavelet filter bank approaches discussed herein, the Fourier transform is replaced by a wavelet transform (or wavelet frame or other sparsifying transforms) $\Omega$, such that:

$$y_j = f_j[(\Omega^T D\Omega X)_j]$$

where D represents the wavelet domain interconnection weights to be learned. In this approach, the network layer(s) in question is a wavelet filter bank composed of a family of wavelet kernels of various spatial and frequency scales. Since wavelets are good at compactly representing spatial variations, they allow space-variant behavior to be learned. This improves the flexibility and capability of the neural network 50, and allows the neural network 50 to learn and perform space-variant tasks without introducing a prohibitively large number of free parameters.

In such a wavelet filter based approach, Haar wavelets or wavelet frames may be employed (as discussed in certain examples herein) or other more image-sparsifying frames (such as curvelets, contourlets, bandlets, steerable-frames, and so forth), can be employed. For larger scale 3D problems where frames might become computation and/or memory intensive, an alternative implementation may employ orthonormal versions of the above wavelet frames, but introduce pseudo-redundancy by means of (randomized) image-translations.

In addition, as used herein the proposed wavelet filter bank based framework should be understood to be different from conventional machine learning methods that may also use wavelet transforms on the input layer of the network so that the original data are pre-transformed into wavelet coefficients before subsequent machine learning tasks are performed. In these conventional approaches, the wavelet transform is applied once at the input layer of the network to extract wavelet coefficients $z=\Omega x$, then a conventional network, i.e., a convolutional neural networks (CNN), is applied to z:

$$y_j = f_j(\Sigma_{i=1}^m h_{j-1} z_i). \qquad (5)$$

In these conventional approaches, the initial wavelet transform does not actually change the architecture, capacity, or flexibility of the CNN. Conversely, in the present implementation of a wavelet filter bank layer of a neural network 50, the wavelet filter banks are incorporated into the internal layers of the neural network 50 and improve the capability of the neural network 50 to learn complicated tasks.

With the preceding in mind, and to facilitate the following detailed discussion and explanation, a high-level example of one implementation is provided here. Based on this generalized example, the subsequent detailed examples and specific implementations may be understood in context. In this generalized implementation, a neural network 50 is trained using a set of training cases. Measured data (e.g., projection data or sinograms) are obtained for a subject from a tomography scanner such as an X-ray CT, PET, SPECT, MR, or C-arm system. One or more tomographic transforms of the measured data are calculated wherein the one or more tomographic transforms, in certain implementations, are associated with a weighted backprojection or a plurality of diagonal elements of a Fisher information matrix. One or more outputs are obtained based on the trained neural network 50 by using the one or more tomographic transforms as one or more inputs 52 to the trained neural network 50. In certain implementation, to further reduce dimensionality of the one or more tomographic transforms the measured data may be divided into non-overlapping or overlapping patches before being input to the trained neural network. In certain embodiments, the measured data are pre-processed before calculating the one or more tomographic transforms of the measured data. Examples of such pre-processing may include, but is not limited to, data (pre-) correction and/or logarithmic manipulation of the measured data.

In some embodiments discussed herein, the tomographic transform of the measured data may be a weighted backprojection, which may be calculated as:

$$b = A^T W g \qquad (6)$$

where g denotes the measured data, A denotes a forward projector or a forward projection operator that maps the image space into the projection data space, and W is a weight matrix. The transpose (or adjoint) $A^T$ of the forward projector represents a backprojection operator. The weight matrix may be an identity matrix and, in such an implementation, the weighted backprojection becomes the ordinary unweighted backprojection. In an alternative embodiment, the inverse of the estimated covariance matrix for the measured data may be used as the weight matrix. If the measured data are statistically independent, then the covariance matrix and the weight matrix are diagonal.

In other embodiments discussed herein, the tomographic transform of the measured data may be a Fisher information matrix (or a tomographic transform derived from such a Fisher information matrix). The Fisher information matrix may be represented as:

$$F = A^T D A \qquad (7)$$

where A denotes a forward projection operator that maps the image space into the projection data space, $A^T$ denotes a backprojection operator that maps the projection data space into the image space and D is a certain diagonal matrix. In X-ray CT, D may represent the estimated mean of the measured data before a logarithm transform or the inverse of the estimated mean of the measured data after a logarithm transform. In PET and SPECT, D may represent the inverse of the estimated mean of the measured data.

Figure 3:
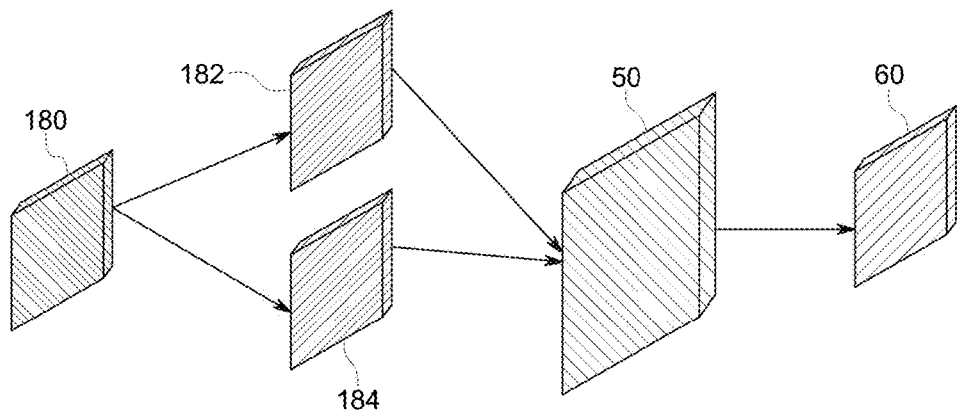
FIG. 3 depicts a first example of a process flow using a transform of a set of measured data to generate an output, in accordance with aspects of the present disclosure.

With the preceding in mind, FIG. 3 depicts an example of a first embodiment. In this embodiment, measured data 180 is initially acquired. The measured state 180, in this example, is used to generate a tomographic transform 182 of the measured data 180. By way of example, the tomographic transform 182 may be Fisher information, a weighted backprojection, or other suitable tomographic transforms as discussed herein. In one such context, the term "Fisher information" refers to the plurality of diagonal elements of the Fisher information matrix or a certain image associated with the plurality of diagonal elements. In addition, an additional input 184 based on the measured data 180 may be generated, such as a reference reconstructed image. In this example, the tomographic transform 182 and additional input 184 (if employed) are input to a trained neural network 50, which in response generates an output 60.

Figure 4:
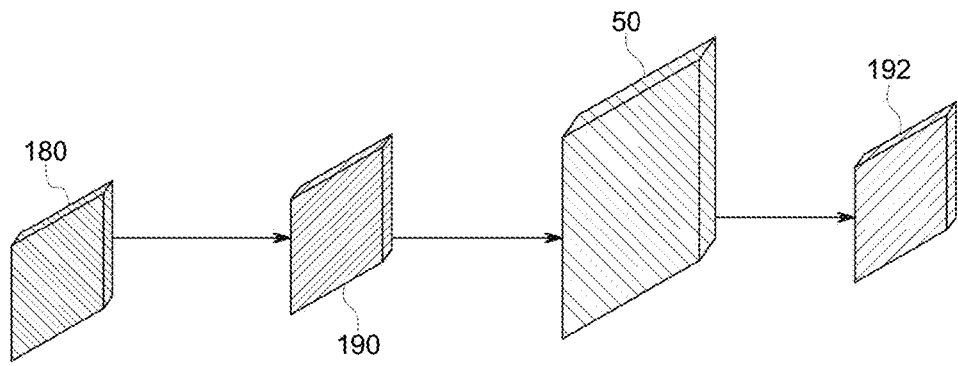
FIG. 4 depicts a second example of a process flow using a transform of a set of measured data to generate an output, in accordance with aspects of the present disclosure.

Turning to FIG. 4, a further example is provided relevant to image reconstruction. In this example, the neural network 50 is trained so as to receive as an input a tomographic transform of the measured data 180 in the form of backprojection(s) 190. The trained neural network 50 in turn outputs a reconstructed image 192. Thus, in this example, the measured data 180 is initially acquired, such as via a CT or other suitable imaging system. A backprojection operation is performed on the measured data to generate backprojection 190, which is provided as an input (with or without additional inputs) to the trained neural network 50 which outputs a reconstructed image 192.

Figure 5:
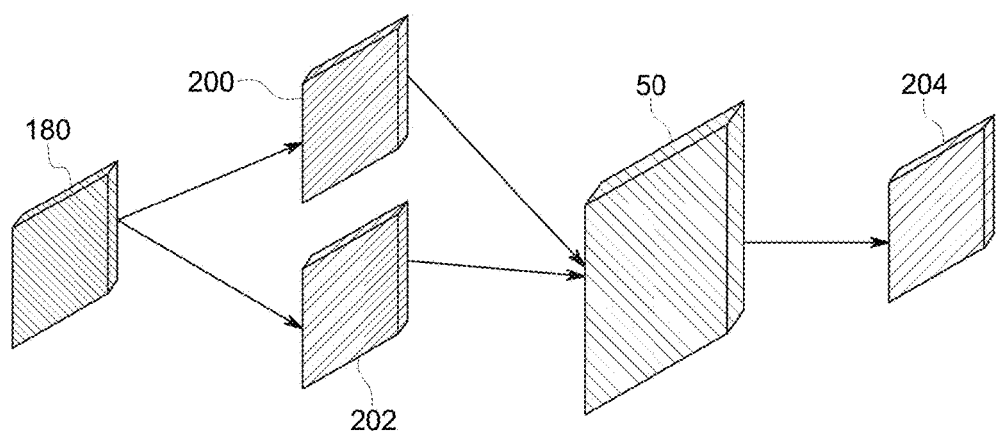
FIG. 5 depicts a third example of a process flow using a transform of a set of measured data to generate an output, in accordance with aspects of the present disclosure.

Conversely, in other examples, the neural network may be trained to output or predict properties of reconstructed images, such as generating and outputting a variance image. We use the term variance image in the general meaning of an image representing the local noise level, which could include an actual variance metric, a standard deviation metric, an image roughness metric, or other similar metrics. These image properties may in turn be used to adjust parameters of a separate reconstruction algorithm and/or post-processing algorithm. For example, turning to FIG. 5, in certain embodiments for noise variance image estimation, Fisher information 200 and a reconstructed image 202 are calculated based on the measured data 180. The trained neural network 50 receives the Fisher information 200 and the reconstructed image 202 as the input, and in turn generates a noise variance image 204 as the output, where the variance image 204 represents voxel-wise variance estimates. This noise information may in turn be used to parameterize or tune one or more of a CT scan protocol, a reconstruction algorithm or post-processing algorithm.

With respect to the reconstructed image 202 generated from the measured data 180 and used as an input to the neural network 50, in embodiments where such reconstructed images 202 are used as inputs, only one set of the reconstructed images from a given reconstruction algorithm are needed. As will be appreciated, and as discussed in greater detail below, there are a variety of different reconstruction algorithms that exist for different modalities, some of which may be complicated and/or computationally costly.

Figure 6:
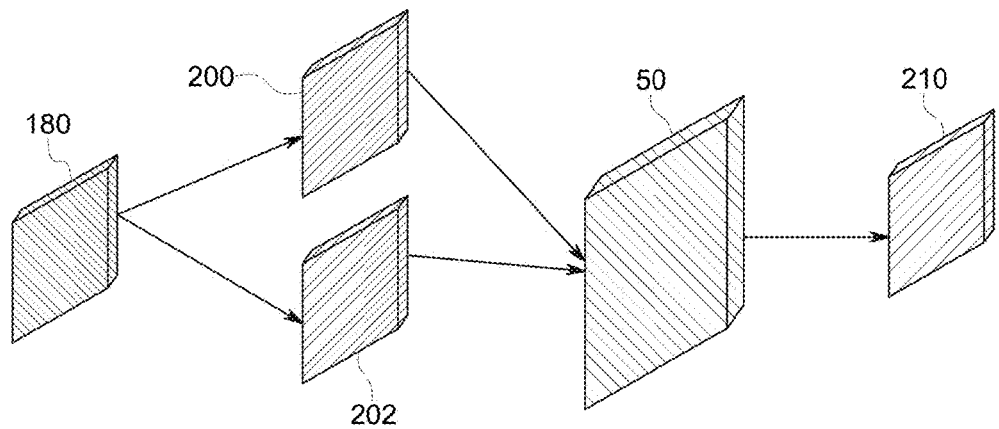
FIG. 6 depicts a fourth example of a process flow using a transform of a set of measured data to generate an output, in accordance with aspects of the present disclosure.
Figure 7:
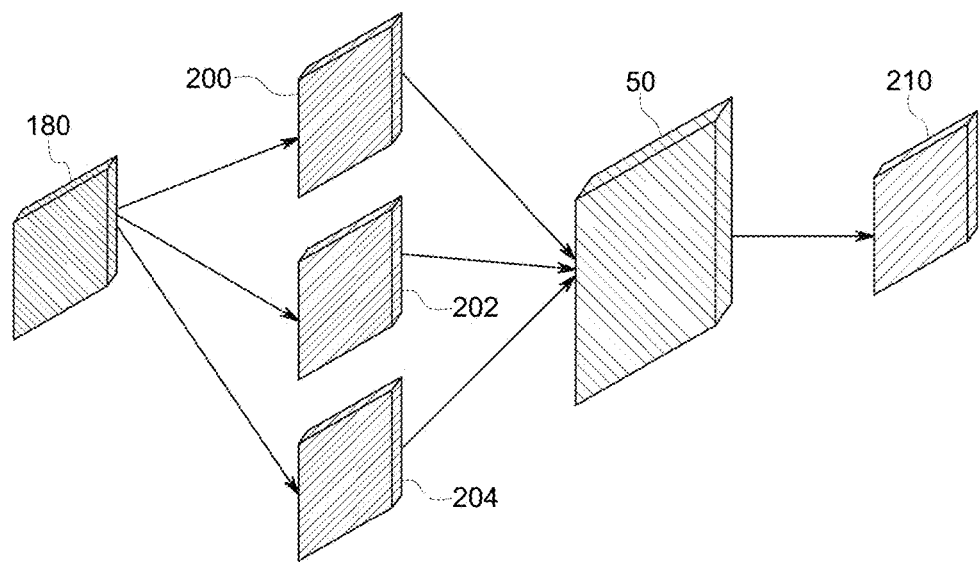
FIG. 7 depicts a fifth example of a process flow using a transform of a set of measured data to generate an output, in accordance with aspects of the present disclosure.

Building on this example, and turning to FIG. 6, using the same inputs, a differently trained neural network 50 may instead be trained to generate a denoised image and noise pattern 210 as an output. In such an example of image denoising and noise pattern estimation, the Fisher information 200 and a reconstructed image 202 are calculated based on the measured data 180. The trained neural network 50 receives the Fisher information 200 and the reconstructed image 202 as the input and generates a denoised image 210 with a noise pattern (i.e., the reconstructed image minus the denoised image) as the output. In an alternative implementation, shown in FIG. 7, a noise variance image 204 or a noise correlation image may be used as an additional input to the trained neural network 50 to generate the denoised image and noise pattern 210.

Figure 8:
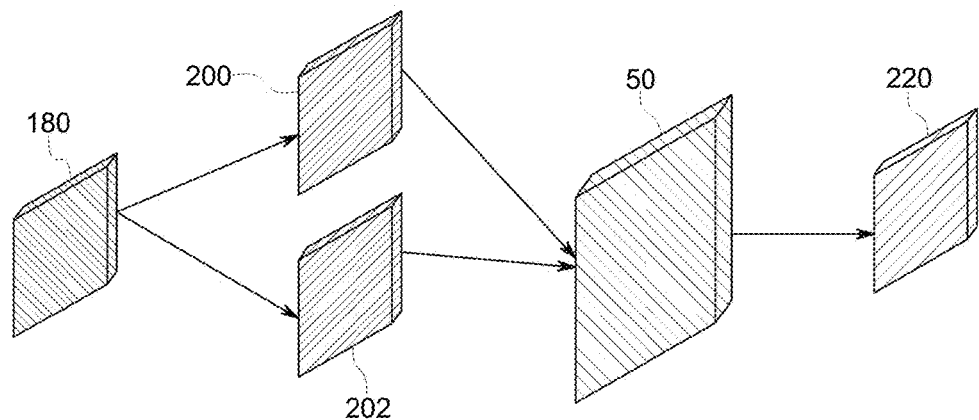
FIG. 8 depicts a sixth example of a process flow using a transform of a set of measured data to generate an output, in accordance with aspects of the present disclosure.

Turning to FIG. 8, in a further embodiment, the neural network 50 may instead be trained to output a partial volume error (PVE) corrected image 220. For example, in one such embodiment for partial volume correction, Fisher information 200 and a reconstructed image 202 are calculated based on the measured data 180. The trained neural network 50 receives the Fisher information 200 and the reconstructed image 202 as the input and generates a partial volume-based output 220 of one or more of a partial volume error corrected image, a partial volume corrected standardized uptake value (SUV), or a partial volume error correction factor. Such an approach may also be used for artifact correction, scatter correction, and so forth.

As will be appreciated, certain of the preceding examples employ a reconstructed image 202 derived from measured data 180 as an input to the trained neural network 50. While in certain implementations conventional image reconstruction approaches and algorithms may be employed to generate the reconstructed images 202 input to the neural network 50, in other implementations algorithms may be employed that are designed to retain more information form the projection data (i.e., measured data 180) than conventional approaches.

In particular, it may be appreciated that when performing a standard reconstruction (such as filtered backprojection (FBP)), some of the information present in the original projection data (i.e., measured data 180) is lost. Advanced iterative reconstruction algorithms may be used to reconstruct better images, yet even these images do not contain all of the information present in the original projection data 180. As a result, when a reconstructed image generated using a conventional reconstruction algorithm is used as the input for a neural network 50, some of the information present in the projection data is already lost.

With this in mind, in certain embodiments discussed herein a reconstruction is performed to generate a reconstructed image 202 that is used as an input to a neural network 50 but which may not be displayed or otherwise provided for visual inspection or clinical use. In particular, such an initial reconstructed image 202 may be generated using an algorithm or technique that preserves information present in the measured data 180 (e.g., projection data) better than conventional reconstruction techniques, where the reconstructed image is intended for display or viewing.

Figure 9:
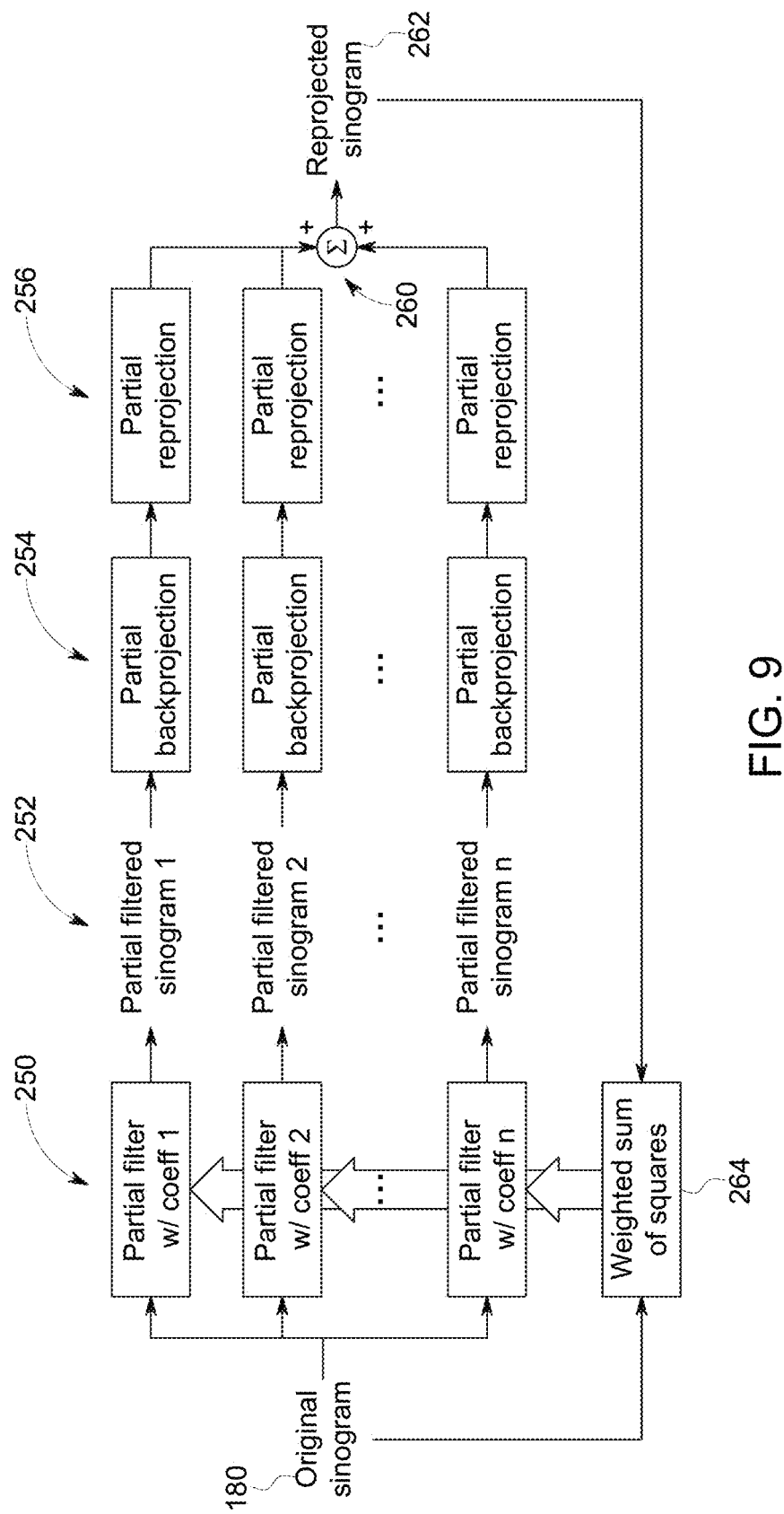
FIG. 9 depicts a process flow for training filter coefficients, in accordance with aspects of the present disclosure.

By way of example, such a reconstruction approach for generating a reconstructed image 202 for use as a neural network 50 input may utilize a smaller voxel size and/or a larger image matrix so that more information can be represented by the reconstructed image 202 than by a conventionally reconstructed image. For example a voxel size of 0.25 mm may be used and/or an image matrix of 2048×2048×the number of slices. Further, the reconstruction algorithm employed may differ from a conventional reconstruction algorithm. For example, the reconstruction algorithm employed to generate a reconstructed image 202 for use as a neural network 50 input may be a filtered backprojection (FBP) with a special filter kernel. The special filter coefficients for each channel can be determined by performing partial reconstructions and reprojections and tuning the coefficients in a way that preserves the original sinogram (i.e., measured data 180), as shown in FIG. 9. In this example, the original sinogram may undergo partial filtering (steps 250) using various coefficients (here 1 through n) to generate n partial filtered sinograms 252. The partial filtered sinograms 252 may be partial backprojected (step 254) and subsequently partial reprojected (step 256) and the results summed (step 260) to generate a reprojected sinogram 262. The weighted sum of square difference (step 264) of the original sinogram 180 and reprojected sinogram 262 can then be used to tune then coefficients used to partial filter the original sinogram 180 in an iterative process, such as until the weighted sum of squares is minimized or otherwise reaches a suitable threshold.

By way of example, the filter tabs can be optimized as a weighted least squares optimization problem:

$$\operatorname{argmin}_{c_k} \Sigma W(c_k A A^T U_k Y - Y)^2 \qquad (8)$$

where Y is the original sinogram, $U_k$ is the sinogram filtering operation that has filter coefficient k set to 1 and all other filter coefficients set to zero, A and $A^T$ are the reprojection and backprojection operations, W is an optional diagonal weighting matrix, and $c_k$ is the to-be-optimized filter coefficient for filter tab k.

Alternatively, in another approach an iterative FBP technique may be employed to generate a reconstructed image 202 for use as a neural network 50 input. For example, the FBP may be applied iteratively such that the residual error sinogram becomes small, at which point the reconstructed image represents the original information content to a suitable extent.

Figure 10:
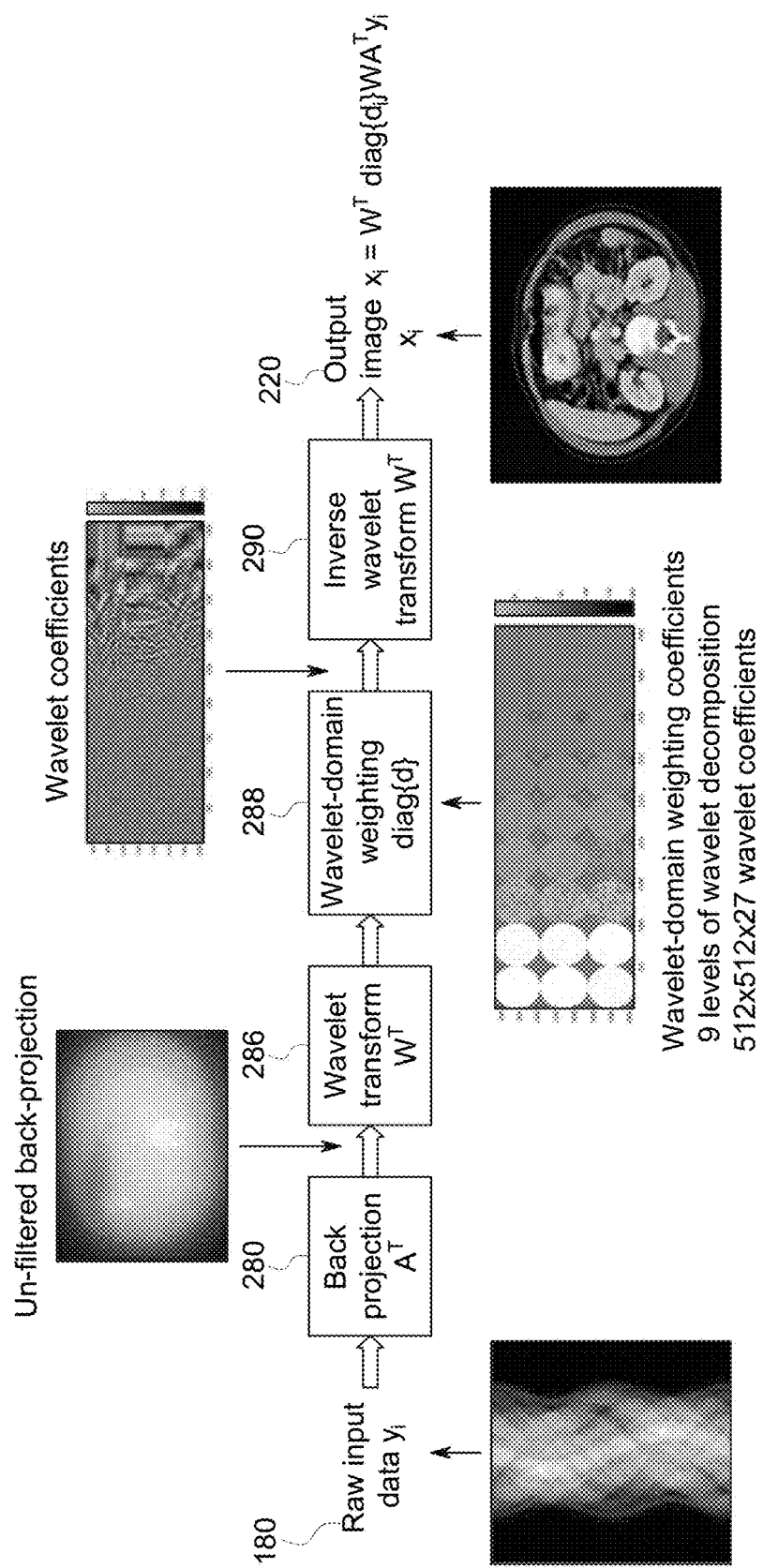
FIG. 10 illustrates steps in the processing chain of the deep learning system, in accordance with aspects of the present disclosure.

With the preceding discussion in mind, a number of examples are provided below demonstrating a two-dimensional (2D) fan beam CT reconstruction task for a GE Discovery CT 750 HD CT system (888 detector channels, 984 projections/rotation). FIG. 10 graphically illustrates steps in the processing chain of the deep learning system.

Turning to FIG. 10, in this study raw input data (CT sinogram) (i.e., measured data 180) was first backprojected (step 280) into image space to generate an unfiltered backprojection. A wavelet filter bank was constructed (steps 286, 288, 290) to perform image reconstruction. A Haar wavelet frame with 9 levels of decomposition was used as the filter kernels.

Figure 11:
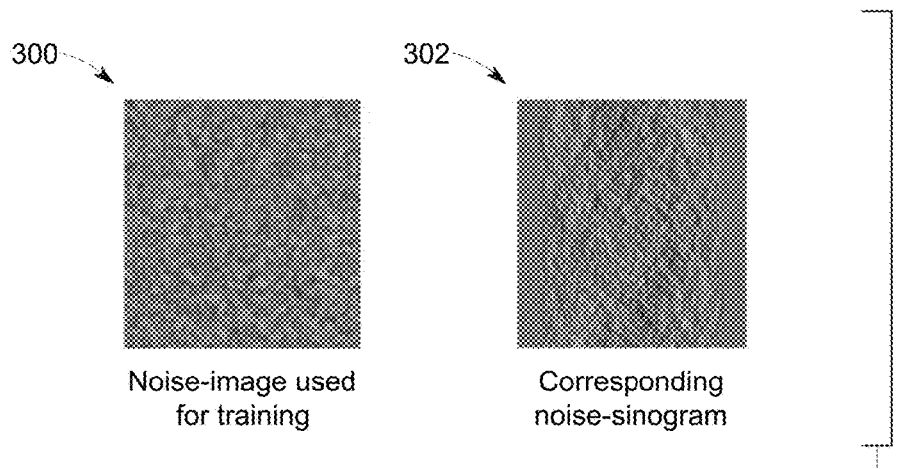
FIG. 11 depicts a paired noise pattern and noise sinogram, in accordance with aspects of the present disclosure.

The wavelet-domain weighting factors were trained by 200 pairs of simulated ground truth objects and the corresponding CT sinogram as training examples. Computer generated Gaussian noise patterns were used as the training examples. FIG. 11 shows an instance of a pair of the noise pattern 300 and the corresponding CT sinogram 302 used in the training process. Training was performed in the same manner as a conventional CNN.

Figure 12:
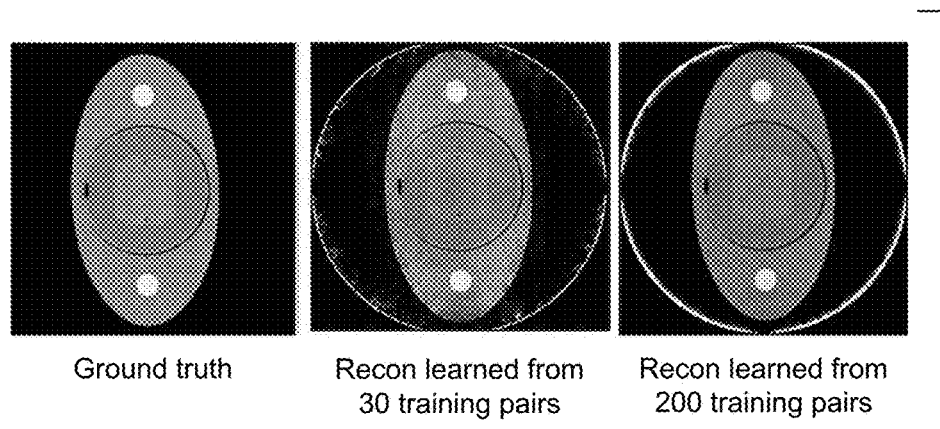
FIG. 12 shows output images reconstructed by a deep learning system, in accordance with aspects of the present disclosure.

FIG. 12 shows output images reconstructed by the deep learning system of the study described above corresponding to a validation dataset that was not used in training the neural network 50. The output images were obtained after training the machine learning system with 30 examples (middle image) and 200 examples (rightmost image), respectively, with the ground truth image displayed on the left for reference.

Technical effects of the invention include the use of machine learning and deep learning systems suitable for solving large-scale, space-variant tomographic reconstruction and/or correction problems. The present approach addresses and overcomes limitations of existing convolutional neural networks (CNN) or other brute-force approaches for applying learning-based techniques to tomographic reconstruction/correction and may provide a mechanism to solve tomographic reconstruction or image correction and/or restoration problems and outperform conventional analytical or iterative algorithms in terms of: compute time, noise and artifacts reduction, accuracy, resolution, and so forth. The present approach may be applied in a variety of tomography context, including, but not limited to image reconstruction, image denoising, partial volume correction, determination or correction of a standard uptake value (SUV), quantitation correction, noise variance estimation, and so on.

In certain embodiments, a tomographic transform of measured data obtained from a tomography scanner (such as an X-ray CT, PET, SPECT, MR, or C-arm system) is used as an input to a neural network 50. In accordance with certain aspects of the present approach, the tomographic transform operation(s) is performed separate from or outside the neural network 50 such that the result of the tomographic transform operation is instead provided as an input to the neural network 50. Thus, as discussed herein, using a tomographic transform of the measured data as an input 52 to the neural network 50 reduces the complexity and dimensionality of a given reconstruction problem and may help map the data to an intermediate data space that is more advantageous for further processing by the neural network 50. In addition, in certain embodiments discussed herein, one or more layers of the neural network may be provided as wavelet filter banks.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
   obtaining measured data from a tomography scanner;
   calculating one or more tomographic transforms of the measured data, wherein the one or more tomographic transforms comprise at least one of a backprojection, a weighted backprojection, a reprojection, a plurality of diagonal elements of a Fisher information matrix, a variance image, a noise correlation image, or a polynomial of the Fisher information matrix;
   providing inputs to a trained neural network, wherein the inputs comprise the one or more tomographic transforms and an input reconstructed image, and the input reconstructed image comprises a filtered backprojection image with a special filter kernel, wherein the filter coefficients are selected that preserve the original sinogram after a reprojection; and
   obtaining one or more outputs from the trained neural network based on the inputs.

2. The method of claim 1, further comprising:
   training a neural network using a plurality of training cases.

3. The method of claim 2, wherein the plurality of training cases comprises one or more computer generated random patterns comprising Gaussian blobs, random noise patterns, or random shapes.

4. The method of claim 1, wherein the tomography scanner comprises one of an X-ray computed tomography (CT) scanner, a positron emission tomography (PET) scanner, a single photon emission computed tomography (SPECT) scanner, a magnetic resonance imaging (MM) scanner, or a C-arm scanner.

5. The method of claim 1, wherein the one or more outputs comprise an output reconstructed image.

6. The method of claim 1, wherein the inputs further comprise at least one of an input variance image or an input noise correlation image in addition to the input reconstructed image.

7. The method of claim 1, wherein the one or more outputs comprise an output variance image.

8. The method of claim 1, wherein the one or more outputs comprise one or more of a partial volume error corrected image, a partial volume error corrected standardized uptake value, or a partial volume error correction factor.

9. The method of claim 1, wherein the one or more outputs comprise one or more of a denoised image or a noise pattern.

10. The method in claim 1, wherein the neural network is space-variant and based on wavelet filter banks, wavelets, wavelet frames, curvelets, or other sparsifying transforms.

11. A method comprising:
    obtaining measured data from a tomography scanner;
    providing inputs to a trained neural network comprising one or more of the measured data or one or more tomographic transforms of the measured data, wherein the neural network comprises at least one layer based on wavelets, wavelet frames, curvelets, or other sparsifying transforms, wherein the inputs further comprise a reconstructed image in addition to the one or more tomographic transforms or the one or more of the measure data, wherein the reconstructed image comprises at least one filtered backprojection image with a special filter kernel, wherein the filter coefficients are selected so as to preserve the original sinogram after a reprojection; and
    obtaining one or more outputs from the trained neural network based on the inputs.

12. The method of claim 11, wherein the at least one layer comprises a wavelet filter bank.

13. The method of claim 11, wherein the one or more tomographic transforms comprise at least one of a backprojection, a weighted backprojection, a reprojection, a variance image, a noise correlation image, a plurality of diagonal elements of a Fisher information matrix, or a polynomial of the Fisher information matrix.

14. The method of claim 11, wherein the neural network is space-variant.

15. An image processing system comprising:
- a processing component configured to execute one or more stored processor-executable routines; and
- a memory storing the one or more executable-routines, wherein the one or more executable routines, when executed by the processing component, cause acts to be performed comprising:
  - acquiring or accessing a set of scan data, wherein the set of scan data is initially represented by a set of original measurements;
  - calculating one or more tomographic transforms of the set of scan data;
  - providing the one or more tomographic transforms and an input reconstructed image as inputs to a trained neural network, wherein the input reconstructed image comprises a filtered backprojection image with a special filter kernel, wherein the filter coefficients are selected that preserve the original sinogram after a reprojection, and wherein the trained neural network comprises at least one layer based on a wavelet filter bank, wavelets, wavelet frames, curvelets, or other sparsifying transforms; and
  - obtaining one or more outputs from the trained neural network based on the inputs.

16. The image processing system of claim 15 wherein the set of scan data comprises computed tomography (CT) scan data, C-arm scan data, positron emission tomography (PET) scan data, single photon emission computed tomography (SPECT) scan data, or magnetic resonance imaging (MRI) scan data.

17. The image processing system of claim 15, wherein the one or more tomographic transforms comprise at least one of a backprojection, a weighted backprojection, a reprojection, a variance image, a noise correlation image, a plurality of diagonal elements of a Fisher information matrix, or a polynomial of the Fisher information matrix.

18. The image processing system of claim 15, wherein the one or more outputs comprise one or more of an output reconstructed image, a variance image, a partial volume error corrected image, a partial volume error corrected standardized uptake value, a partial volume error correction factor, or one or more of a denoised image or a noise pattern.

* * * * *